(12) United States Patent
Fan et al.

(10) Patent No.: US 11,940,653 B2
(45) Date of Patent: Mar. 26, 2024

(54) DIFFRACTIVE OPTICAL WAVEGUIDE AND DISPLAY DEVICE HAVING THE SAME

(71) Applicant: JIAXING UPHOTON OPTOELECTRONICS TECHNOLOGY CO., LTD., Tongxiang (CN)

(72) Inventors: Zhentao Fan, Tongxiang (CN); Xingming Zhao, Tongxiang (CN); Kehan Tian, Tongxiang (CN)

(73) Assignee: JIAXING UPHOTON OPTOELECTRONICS TECHNOLOGY CO., LTD., Tongxiang (CN)

( * ) Notice: Subject to any disclaimer, the term of this patent is extended or adjusted under 35 U.S.C. 154(b) by 0 days.

(21) Appl. No.: 18/315,738

(22) Filed: May 11, 2023

(65) Prior Publication Data
US 2023/0367078 A1    Nov. 16, 2023

(30) Foreign Application Priority Data
May 13, 2022   (CN) .......................... 202210522596.6

(51) Int. Cl.
| | | |
|---|---|---|
| *G02B 6/34* | (2006.01) | |
| *F21V 8/00* | (2006.01) | |
| *G02B 27/01* | (2006.01) | |
| *G02B 27/09* | (2006.01) | |

(52) U.S. Cl.
CPC ............. *G02B 6/34* (2013.01); *G02B 6/0036* (2013.01); *G02B 27/0172* (2013.01); *G02B 27/0955* (2013.01)

(58) Field of Classification Search
CPC .... G02B 6/34; G02B 6/0036; G02B 27/0172; G02B 27/0955
See application file for complete search history.

(56) References Cited

U.S. PATENT DOCUMENTS

| | | | |
|---|---|---|---|
| 2022/0050233 A1 | 2/2022 | Huang et al. | |
| 2023/0205312 A1* | 6/2023 | Yang | G02B 27/0172 385/37 |

FOREIGN PATENT DOCUMENTS

| | | |
|---|---|---|
| CN | 111175897 A | 5/2020 |
| CN | 113777707 A | 12/2021 |
| JP | 200958553 | 3/2009 |
| JP | 200958553 A | 3/2009 |
| WO | 2018067074 A1 | 4/2018 |

* cited by examiner

*Primary Examiner* — Michael P Mooney
(74) *Attorney, Agent, or Firm* — HAUPTMAN HAM, LLP

(57) ABSTRACT

A diffraction optical waveguide is disclosed, which comprises a grating structure formed on a waveguide substrate. The grating structure comprises a plurality of optical unit structures arranged in an array along a plane; the optical unit structure has a first end and a second end in a first direction parallel to the plane, a distance between the two ends along the first direction is a length L of the optical unit structure; it has a maximum width W perpendicular to the first direction in a predetermined section along the first direction, where 0.3L≤W≤0.7L, and a central position of the predetermined section is at a predetermined distance d from the first end in the first direction, where d<0.5L; and a width gradually decreases from the predetermined section to both ends, so that a centroid of a cross-section of the optical unit structure is closer to the first end.

20 Claims, 6 Drawing Sheets

DIFFRACTIVE OPTICAL WAVEGUIDE AND DISPLAY DEVICE HAVING THE SAME

FILED OF THE DISCLOSURE

The present disclosure relates to a diffraction-based display technology, in particular to a diffraction optical waveguide and a display device having the diffraction optical waveguide.

BACKGROUND

Diffraction-based display technology has developed rapidly in recent years, and it can be applied to a display device such as a near-eye display device, a head-mounted display device, and a head-up display device. A diffraction optical waveguide is an important optical device that can be used in diffraction display technology. The diffraction optical waveguide that can be used for display is provided with a coupling-in grating and a coupling-out grating on a waveguide substrate; the coupling-in grating couples incident light carrying image information into the waveguide substrate; the coupling-out grating propagates and expands the light carrying image information, and at the same time couples the light out of the waveguide substrate to form a coupled-out light field. The eye receives the light of the coupled-out light field so that, for example, an image carried by the incident light can be observed.

The coupling-out grating of the diffraction optical waveguide can adopt a two-dimensional grating structure. In the two-dimensional grating structure, an optical unit structure usually adopts a circular, rectangular, or rhombic structure in cross-section. When light is coupled into such a coupling-out grating, there will be a bright line in the middle. At the same time, it will lead to the reduction of light splitting energy on both sides, which is adverse to expansion of light energy to both sides and affects a light uniformity of the waveguide.

In order to improve brightness and uniformity, a two-dimensional coupling-out grating with an improved parallelogram cross-section is proposed. As shown in a unit structure design diagram of FIG. 1, the left and right ends of the improved parallelogram form vertices of acute angles, two upper vertices and two lower vertices are formed in the middle, a small gap is formed between each two vertices, in addition, there are four long sides at both portions, in which two pairs of opposite sides are parallel, and there are two pairs of parallel short sides in the middle. A coupling-out grating with the improved parallelogram optical unit structure has an effect of weakening the middle bright line of the coupled-out light field, and significantly improves the uniformity among different fields of view of the coupled-out light field.

However, a size of the optical unit structure itself is of wavelength order, and multiple vertices and gaps in the above-mentioned improved parallelogram are smaller in size, and processing accuracy cannot be guaranteed, so there are great difficulties in processing and mass producibility.

SUMMARY

The object of the present disclosure is to provide a diffraction optical waveguide for diffraction-based display and a display device comprising the diffraction optical waveguide, so as to at least partly overcome the deficiencies in the prior art.

According to one aspect of the present disclosure, a diffraction optical waveguide is provided, including a waveguide substrate and a grating structure formed on the waveguide substrate, wherein, the grating structure includes a plurality of optical unit structures arranged in an array along a plane, the optical unit structure is a concave hole structure or a convex structure formed on the waveguide substrate and has a first end and a second end in a first direction parallel to the plane, and a distance between the first end and the second end along the first direction is a length L of the optical unit structure; the optical unit structure has a maximum width W perpendicular to the first direction in a predetermined section along the first direction, where $0.3L \leq W \leq 0.7L$; and in the first direction, a central position of the predetermined section is at a predetermined distance d from the first end, where $d<0.5L$, and a width of the optical unit structure in a direction perpendicular to the first direction gradually decreases from the predetermined section to the first end as well as from the predetermined section to the second end, so that a centroid of a cross-section of the optical unit structure parallel to the plane is closer to the first end relative to the second end.

Advantageously, the grating structure is configured as a coupling-out grating, wherein the coupling-out grating couples at least a part of the light propagating thereinto along a coupling-in direction within the waveguide substrate, out of the waveguide substrate by diffraction, and the coupling-in direction is substantially parallel to the first direction.

Advantageously, the first end of the optical unit structure is located upstream along the coupling-in direction, and the second end is located downstream along the coupling-in direction.

Advantageously, the predetermined distance d satisfies $d \leq 0.4L$.

Advantageously, a length l of the predetermined section in the first direction satisfies $0 \leq l \leq 0.7L$.

Advantageously, the optical unit structure is a concave hole structure formed on the waveguide substrate.

Advantageously, the first end has a first width w1 perpendicular to the first direction, where $0 \leq w1 \leq W$; and the second end has a second width w2 perpendicular to the first direction, where $0 \leq w2 \leq 0.7W$.

Advantageously, the length L and the maximum width W of the optical unit structure satisfy: $0.3L \leq W \leq 0.7L$.

Advantageously, the optical unit structure has a first arc-shaped profile between the predetermined section and the first end, and the first arc-shaped profile is in the shape of an outwardly raised arc.

Advantageously, the optical unit structure has a second arc-shaped profile between the predetermined section and the second end, and the second arc-shaped profile is in the shape of an outwardly raised arc.

The optical unit structure can have a symmetry axis substantially parallel to the first direction.

In some embodiments, the first end has a form of a vertex, a straight side, or a concave side; and/or the second end has a form of a vertex, a straight side, or a concave side.

In some embodiments, the optical unit structure has a side wall connected between the first end and the second end, and a local depression or protrusion is formed on the side wall.

Advantageously, the array includes a plurality of rows perpendicular to the first direction formed by the arrangement of the plurality of optical unit structures; the plurality of rows are arranged at a predetermined interval in the first direction; the optical unit structures are arranged at a period P in the rows; and the optical unit structures in two adjacent rows of the plurality of rows are staggered by a predetermined distance s in a direction perpendicular to the first direction, where s=P/n and 1<n≤5, preferably n=2.

According to another aspect of the present disclosure, a display device is provided, including the diffraction optical waveguide.

In some embodiments, the display device is a near-eye display device and includes a lens and a frame for holding the lens close to the eye, the lens including the diffraction optical waveguide.

In some embodiments, the display device is an augmented reality display device or a virtual reality display device.

According to embodiments of the disclosure, the optical unit structure has a more freeform shape which is not necessary to form a vertex of a certain angle and is not limited to a straight side, without restriction of corresponding sides parallel to each other. The grating structure formed by such an optical unit structure as well as a correspondingly obtained diffraction optical waveguide may have the advantages of easy processing, a high coupled-out efficiency, and a good uniformity.

BRIEF DESCRIPTION OF THE DRAWINGS

Other features, objects, and advantages of the disclosure will become more apparent by reading the following detailed description of non-limitative embodiments with reference to the following drawings.

DETAILED DESCRIPTION

Figure 1:
FIG. 1 is a design diagram of an optical unit structure for a two-dimensional grating in a diffraction optical waveguide of the prior art, wherein the optical unit structure has an improved parallelogram shape.

The present disclosure will be further described in detail in conjunction with drawings and embodiments. It should be understood that the specific embodiments described herein are only used to explain the related invention, but not to limit the invention. For the convenience of description, only the parts related to the invention are shown in the drawings. It should be noted that the embodiments in the present application and the features of the embodiments may be combined with each other without conflict.

A diffraction optical waveguide according to an embodiment of the present invention will be described below with reference to the drawings.

Figure 2:
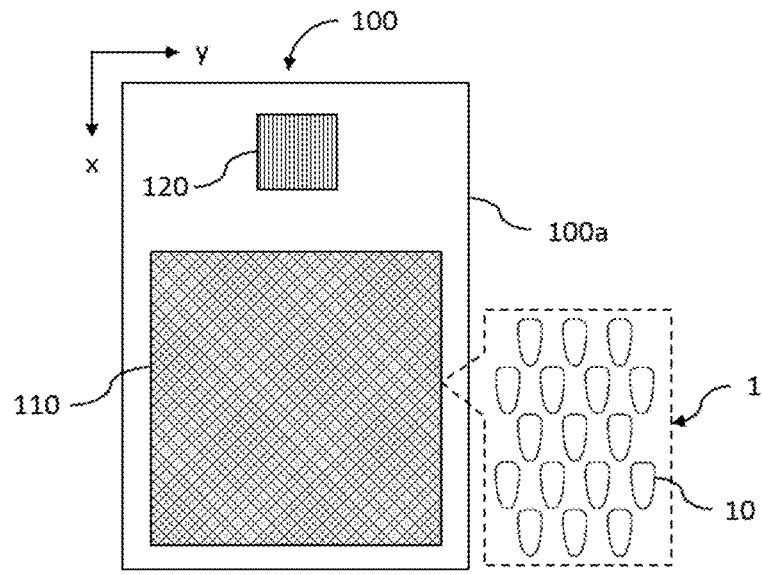
FIG. 2 is a schematic diagram of an example of a diffraction optical waveguide according to an embodiment of the present disclosure.

FIG. 2 is a schematic diagram of an example of a diffraction optical waveguide according to an embodiment of the present invention. As shown in FIG. 2, a diffraction optical waveguide 100 includes a waveguide substrate 100a and a grating structure 1 formed on the waveguide substrate 100a. In the example shown in FIG. 2, the grating structure 1 is configured as a coupling-out grating 110 used for coupling at least a part of the light propagating thereinto along a coupling-in direction within the waveguide substrate 100a, out of the waveguide substrate 100a by diffraction. The diffraction optical waveguide 100 can further include a coupling-in grating 120. The coupling-in direction is a direction in which light propagates from the coupling-in grating 120 to the coupling-out grating 110, and the coupling-in direction is an x direction in the example shown in FIG. 2.

Preferably, a first end 11 of an optical unit structure 10 is located upstream along the coupling-in direction (the x direction shown in FIG. 2), and a second end 12 is located downstream along the coupling-in direction. Advantages of this orientation of the optical unit structure will be illustrated below with Data Examples.

Referring to FIG. 2, the grating structure 1 includes a plurality of optical unit structures 10 arranged in an array along a plane x-y of the waveguide substrate 100a. The optical unit structure 10 can be a concave hole structure or a convex structure formed on the waveguide substrate 100a. Preferably, the optical unit structure 10 is a concave hole structure formed on the waveguide substrate.

Figure 3:
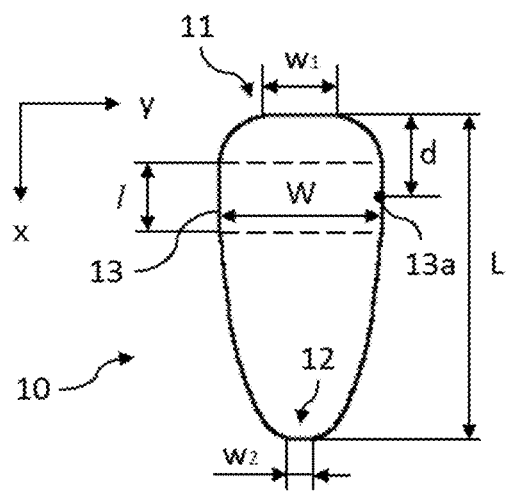
FIG. 3 is an enlarged schematic diagram of an optical unit structure shown in FIG. 2.

FIG. 3 is an enlarged schematic diagram of the optical unit structure shown in FIG. 2. As shown in FIG. 3, the optical unit structure 10 has a first end 11 and a second end 12 in the x direction, and a distance between the first end 11 and the second end 12 along the x direction is a length L of the optical unit structure 10; the optical unit structure 10 has a predetermined section 13 along the x direction (see FIG. 3), and in the predetermined section 13 the optical unit structure 10 has a maximum width W perpendicular to the x direction (that is, along a y direction shown in the figure), where 0.3L≤W≤0.7L; and a width of the optical unit structure 10 in the y direction gradually decreases from the predetermined section 13 to the first end 11 as well as from the predetermined section 13 to the second end 12. According to the embodiment of the present invention, a central position 13a of the predetermined section 13 is at a predetermined distance d from the first end 11 in the x direction, and d<0.5L, so that a centroid of a cross-section of the optical unit structure parallel to the plane is closer to the first end relative to the second end.

According to the embodiment of the present disclosure, the optical unit structure 10 has a more freeform shape, which is not necessary to form a vertex of a certain angle and is not limited to a straight side, without restriction of corresponding sides parallel to each other. The grating structure 1 formed by such an optical unit structure 10 is easy to process and has excellent diffraction characteristics, which will be described in more detail in the following Data Examples.

Continue to refer to FIG. 3, in the optical unit structure 10, the predetermined distance d satisfies d≤0.4L.

Preferably, a length l of the predetermined section 13 in the x direction satisfies 0≤l≤0.7L.

As shown in FIG. 3, the first end 11 has a first width w1 along the y direction, and the second end 12 has a second width w2 along the y direction. Preferably, the first width w1 and the second width w2 satisfy: 0≤w1≤W; 0≤w2≤0.7W.

In addition, it is also preferable that the optical unit structure 10 has arc-shaped structures at both ends. Specifically, the optical unit structure 10 preferably has an outwardly raised arc profile between the predetermined section 13 and the first end 11, as well as between the predetermined section 13 and the second end 12. The two ends of the optical unit structure 10 have a structure with an arc-shaped profile, on the one hand, it is easy to process, and the shape obtained by processing is highly reproducible compared to a designed shape, on the other hand, according to optimization calculation, the grating formed by such an optical unit structure 10 has excellent diffraction characteristics and can achieve good brightness and uniformity of the coupled-out light field.

In the example shown in FIG. 3, the optical unit structure 10 has an axisymmetric structure, and its axis of symmetry is parallel to the x direction. However, according to the embodiments of the present disclosure, the optical unit structure is not limited to a symmetrical structure, and may also be asymmetrical in the x direction, for example.

Figure 4:
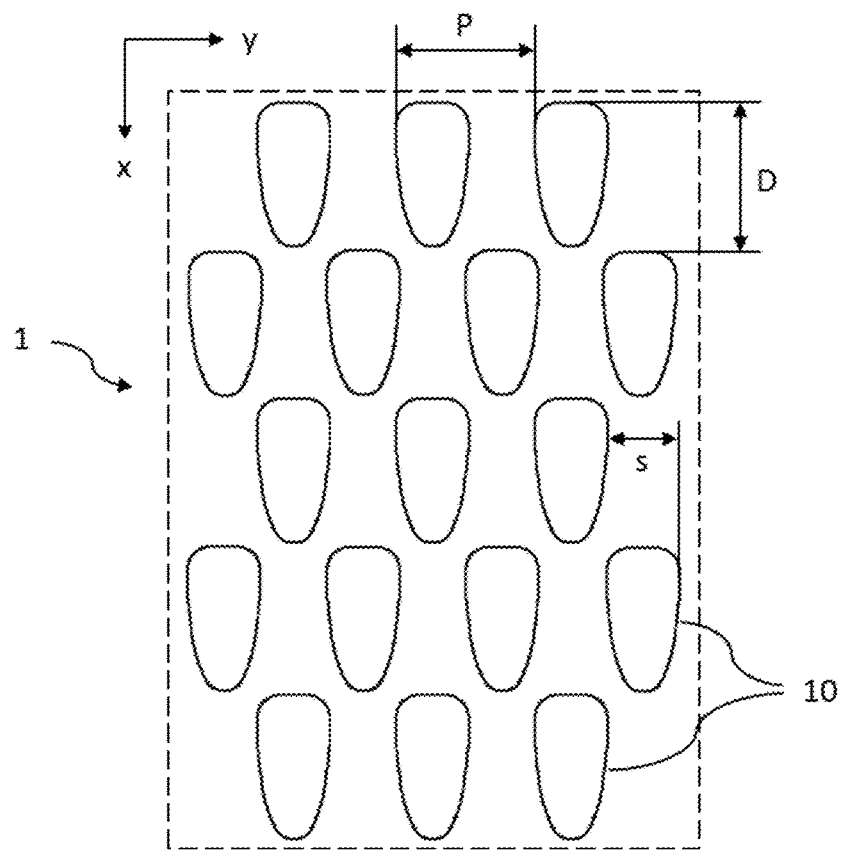
FIG. 4 shows a partially enlarged schematic diagram of an array formed by an arrangement of optical unit structures shown in FIG. 3.

FIG. 4 shows a partially enlarged schematic diagram of the array/grating structure 1 formed by the arrangement of optical unit structures 10. As shown in FIG. 4, the array includes a plurality of rows perpendicular to the x direction (that is, along the y direction) formed by the arrangement of the plurality of optical unit structures 10, the plurality of rows are arranged at a predetermined interval D in the x direction, the optical unit structures 10 are arranged at a period P in each row, and the optical unit structures 10 in two adjacent rows of the plurality of rows are staggered by a predetermined distance s in a direction perpendicular to the first direction, where s=P/n and 1<n≤5. Here, n can be an integer or a non-integer. When n is 2, the grating structure 1 formed by the array is symmetrical in the y direction and can provide symmetrical and uniform diffraction characteristics and effects on both sides of the y direction.

Figure 5:
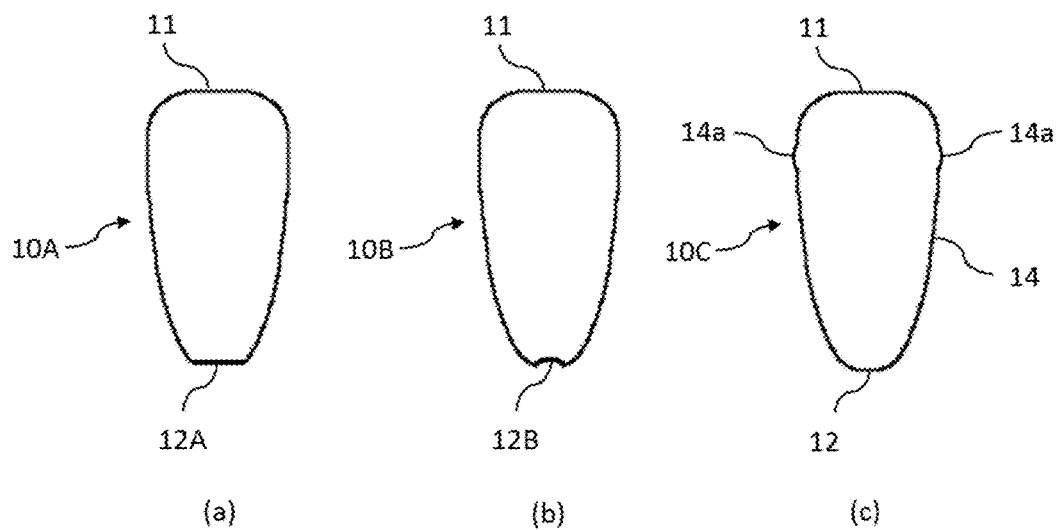
FIG. 5 schematically shows different variants of a cross-section of an optical unit structure that can be used for a diffraction optical waveguide according to an embodiment of the present disclosure.

FIG. 5 schematically shows different variants of a cross-section of an optical unit structure that can be used for a diffraction optical waveguide according to an embodiment of the present disclosure.

In the example shown in graph (a) of FIG. 5, a second end 12A of an optical unit structure 10A has a straight side, which is different from the second end 12 with an arc vertex shown in FIG. 3. In the example shown in graph (b) of FIG. 5, a second end 12B of an optical unit structure 10B has a concave side. The first ends 11 of the optical unit structures shown in FIG. 5 all have a straight side. Although not shown, according to an embodiment of the present disclosure, the first end 11 of the optical unit structure can also have a vertex or a concave side.

In the example shown in graph (c) of FIG. 5, a local protrusion 14a is formed on a side wall 14 of an optical unit structure 10C connected between the first end 11 and the second end 12. Although not shown, in other examples, a local depression can also be formed on the sidewall 14.

In addition, in other examples of the embodiment of the present disclosure, the sidewall 14 of the optical unit structure can include a serrated side formed by a plurality of straight sides. Such a structure takes into account a precision that can be achieved in actual processing.

Figure 6:
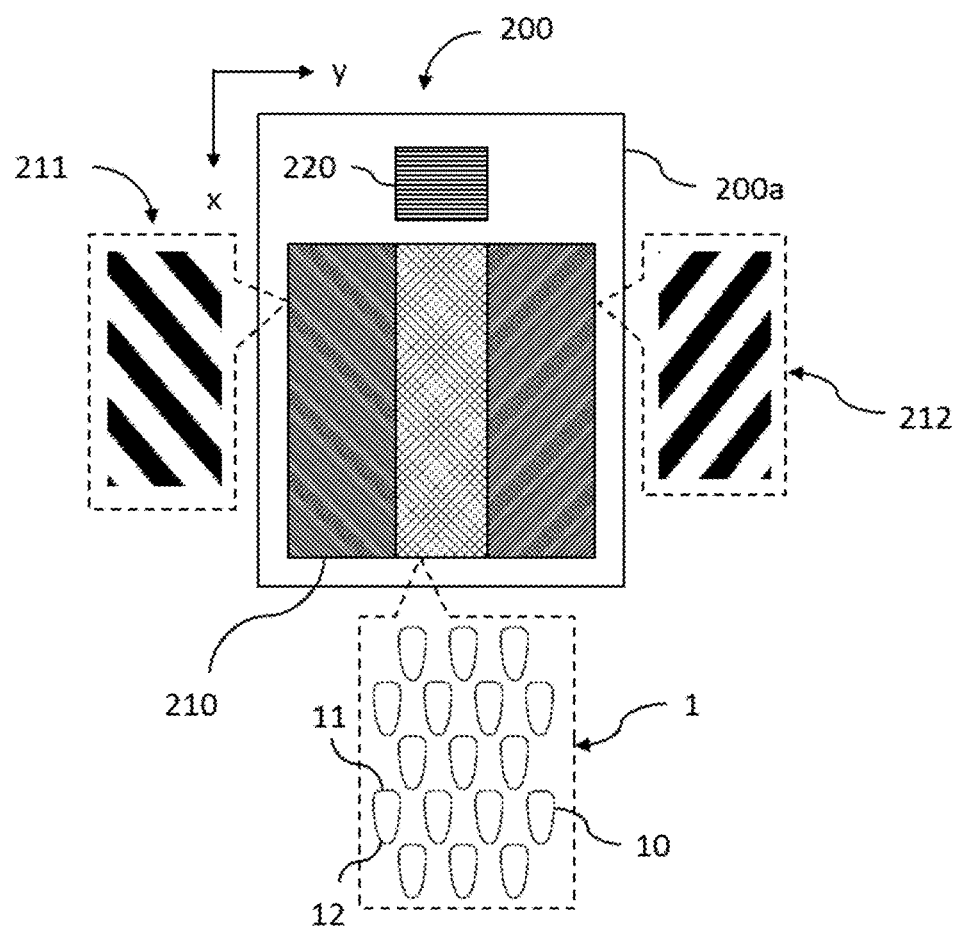
FIG. 6 is a schematic diagram of another example of a diffraction optical waveguide according to an embodiment of the present disclosure.

FIG. 6 is a schematic diagram of another example of a diffraction optical waveguide according to an embodiment of the present disclosure. As shown in FIG. 6, a diffraction optical waveguide 200 includes a waveguide substrate 200a and a coupling-out grating 210 formed on a surface of the waveguide substrate 200a. The coupling-out grating 210 is configured to couple at least a part of the light propagating thereinto along a coupling-in direction within the waveguide substrate 200a, out of the waveguide substrate 200a by diffraction. The coupling-out grating 210 includes a grating structure 1 and additional grating structures 211 and 212. The grating structure 1 is the same as the grating structure 1 described above with reference to FIGS. 2 to 4. The additional grating structures 211 and 212 are one-dimensional gratings, which are arranged respectively on both sides of the grating structure 1 in the x-direction and adjoin it. Since a diffraction efficiency of a one-dimensional grating is generally higher than that of a two-dimensional grating, the additional grating structures 211 and 212 are beneficial for improving a coupled-out efficiency of an entire coupling-out grating 210 and at the same time help to increase brightness of two sides of the coupled-out light field, thereby improving the uniformity.

As shown in FIG. 6, the diffraction optical waveguide 200 may further include a coupling-in grating 220. Preferably, the first end 11 of the optical unit structure 10 in the grating structure 1 is located upstream along the coupling-in direction (that is, the direction in which light propagates from the coupling-in grating 220 to the coupling-out grating 210, that is, the x direction shown in FIG. 6), and the second end 12 is located downstream along the coupling-in direction.

The diffraction optical waveguide according to the embodiment of the present disclosure can be applied in a display device. Such a display device is, for example, a near-eye display device, which includes a lens and a frame for holding the lens close to the eye, wherein the lens can include the diffraction optical waveguide according to the embodiment of the present invention as described above. Preferably, the display device may be an augmented reality display device or a virtual reality display device.

Finally, in order to illustrate the technical advantages of the diffraction optical waveguide according to the embodiment of the present disclosure in terms of a light coupled efficiency and a uniformity, and to illustrate an optimal value of structure parameters of the optical unit structure. Data Examples of simulation calculation will be given below. A wavelength of light used in the following Data Examples is 532 nm.

(Data Example 1)

Figure 7:
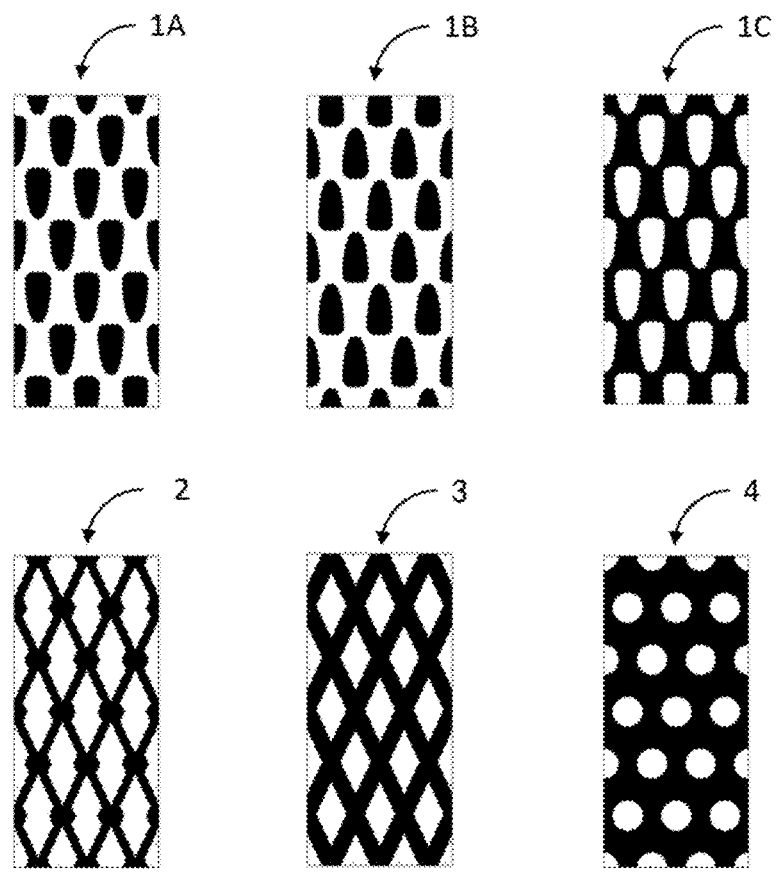
FIG. 7 shows grating structures with different optical unit structures.

FIG. 7 shows grating structures with different optical unit structures and the same other parameters. In the grating structures shown in FIG. 7, the optical unit structures in the grating structures 1A, 1B, and 1C are the optical unit structures described above in conjunction with FIG. 3 and FIG. 4 and have the same cross-section. For specific parameters of the cross-section of the optical unit structures in the grating structures 1A, 1B, and 1C, refer to Table 1 (unit: nm).

TABLE 1

|  | L | W | w1 | w2 | d | l | P | D | n |
|---|---|---|---|---|---|---|---|---|---|
| 1A、1B、1C | 436 | 219 | 102 | 34 | 109 | 100 | 420 | 450 | 2 |

In the grating structure 1A, the optical unit structure is a concave hole structure formed on the waveguide substrate, and the first end is located upstream of the second end along the coupling-in direction. The grating structure 1B is different from the grating structure 1A in that the first end of the optical unit structure in the grating structure 1B is located downstream of the second end along the coupling-in direction. The grating structure 1C is different from the grating structure 1A in that the optical unit structure in the grating structure 1C is a convex structure formed on the waveguide substrate.

An optical unit structure in the grating structure 2 shown in FIG. 7 is a convex structure and has the improved parallelogram cross-section introduced above, the improved parallelogram has vertices of 50°, in upper and lower directions shown in the figure, and four vertex angles in the middle are all 130°, a length of four long sides is 300 nm, and a length of four short sides is 85 nm.

An optical unit structure in the grating structure 3 shown in FIG. 7 is a convex structure and has a rhombus cross-section, vertex angles of the rhombus in the upper and lower directions are 50°, and a length of a side is 290 nm.

An optical unit structure in the grating structure 4 shown in FIG. 7 is a convex structure and has a circular cross-section, and the radius of a circle is 250 nm.

Based on the above-mentioned grating structures shown in FIG. 7 and based on the same conditions of light coupling into the grating structures, the coupled-out efficiencies EFF(s) and uniformity indices UNI(s) of the grating structures at the centers of their eye boxes obtained by simulation are shown in Table 2.

TABLE 2

| Grating structure | 1A | 1B | 1C | 2 | 3 | 4 |
|---|---|---|---|---|---|---|
| EFF | 2.5e-4 | 2.4e-4 | 2.6e-4 | 2.1e-4 | 2.9e-4 | 4.2e-4 |
| UNI | 3.3 | 5.2 | 8.0 | 3.0 | 11.5 | 75.7 |

Here, a uniformity index UNI is a ratio of a maximum light intensity to a minimum light intensity in the coupled-out light field, and the smaller the ratio, the better the uniformity; and a coupled-out efficiency EFF is a ratio of an average of light intensity at each field of view angle of the coupled-out light field to a light intensity of the coupled-in light of the grating structure. The larger the value of EFF, the higher the coupling-out efficiency.

Figure 8:
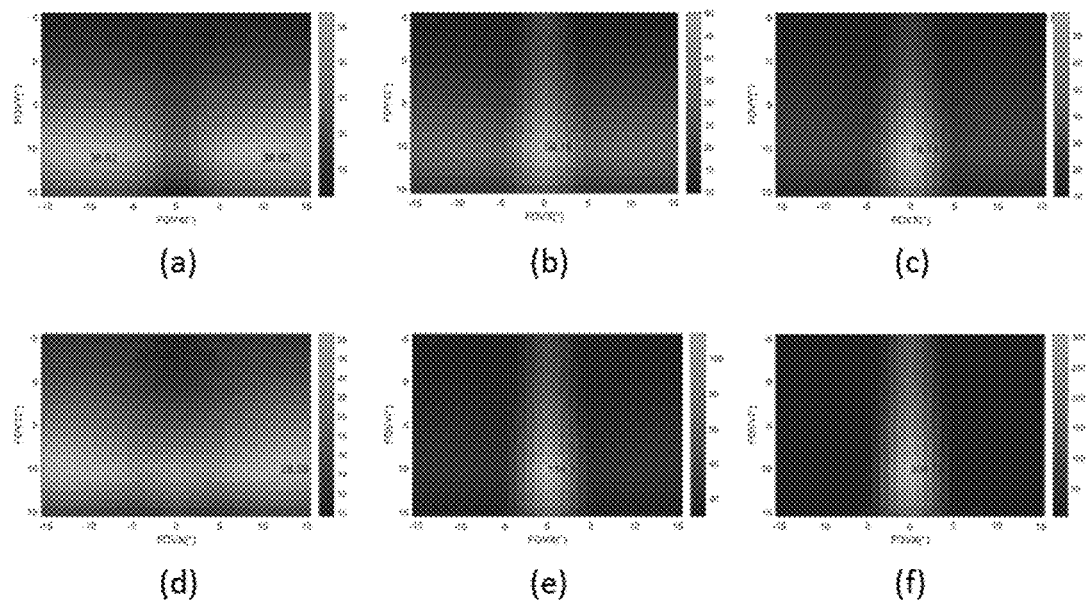
FIG. 8 shows light intensity distribution diagrams within a range of the field of view angle calculated by a simulation of grating structures shown in FIG. 7.

Light intensity distribution diagrams within the range of the field of view obtained by simulation calculation are shown in FIG. 8, in which distribution diagrams (a), (b), (c), (d), (e), and (f) correspond to the grating structures 1A, 1B, 1C, 2, 3 and 4, respectively. The maximum light intensity in each light intensity distribution diagram shown in FIG. 8 is displayed as the same brightness/grayscale in the drawing, but actual light intensities are different; similarly, the minimum light intensity in each light intensity distribution diagram is displayed as the same brightness/grayscale in the drawing, but actual light intensities are also different. The light intensity distribution situations shown in FIG. 8 should be seen in combination with the uniformity indices UNI(s) in Table 2.

First, it can be seen from Table 2 that the uniformities of the coupled-out light field of the grating structure 3 with rhombic optical unit structures and the grating structure 4 with circular optical unit structures within the range of field of view angle are very poor; the grating structure 2 with the improved parallelogram optical unit structure has an excellent uniformity; the grating structures 1A, 1B, and 1C having the optical unit structures proposed in this application have significantly improved uniformities as a whole relative to the grating structures 3 and 4, and the grating structure 1A has an excellent uniformity comparable to that of the grating structure 2 and is superior in uniformity with respect to the grating structures 1B and 1C. It can be further seen from FIG. 8 that, the grating structure 1A is better in uniformity than the grating structures 1B and 1C, and has a similar uniformity as the grating structure 2.

From the coupled-out efficiencies EFF(s) in Table 2, it can be seen that the grating structures 1A, 1B, and 1C with the optical unit structures proposed in this application have higher coupled-out efficiencies than the grating structure 2 with the improved parallelogram optical unit structure, wherein the coupled-out efficiency EFF of the grating structure 1A is about 19% higher than the coupled-out efficiency EFF of the grating structure 2.

The above Data Examples have shown that the grating structure/diffraction optical waveguide with the optical unit structure proposed in this application can advantageously obtain better coupled-out efficiency and uniformity, in terms of an effect that can be achieved only in theory. At the same time, further considering the ease of processing of the optical unit structure proposed in this application, it can be predicted that it is possible to realize further optimization of the efficiency and uniformity by the diffraction optical waveguide according to the embodiment of the present disclosure.

(Data Example 2)

In Data Example 2, the coupled-out efficiencies and uniformity indices of the grating structures in which optical unit structures have cross sections with different length-width ratios are simulated and compared.

Figure 9:
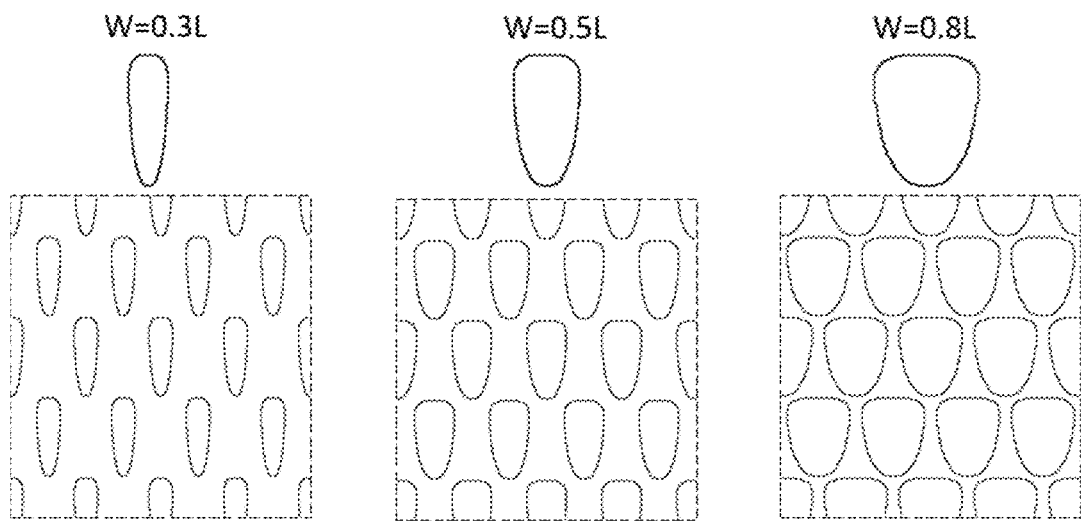
FIG. 9 shows optical unit structures with different length-width ratios and grating structures formed therefrom.

FIG. 9 shows optical unit structures with different length-width ratios and three grating structures formed therefrom. As shown in FIG. 9, for the three grating structures, the maximum widths W(s) of the optical unit structures are 0.3L, 0.5L, and 0.8L respectively, and other structure parameters are shown in Table 3 (unit: nm):

TABLE 3

|  | L | W | w1 | w2 | d | l | P | D | n |
|---|---|---|---|---|---|---|---|---|---|
| 1A、1B、1C | 436 | variabl | 102 | 34 | 109 | 100 | 420 | 450 | 2 |

Based on the structures shown in FIG. 9 and the same conditions of light coupled into the grating structures, the coupled-out efficiencies EFF(s) and uniformity indices UNI(s) of the grating structures at the centers of their eye boxes obtained by simulation are shown in Table 4:

TABLE 4

|  | W = 0.3 L | W = 0.5 L | W = 0.8 L |
|---|---|---|---|
| EFF | 1.6e−4 | 2.5e−4 | 2.1e−4 |
| UNI | 3.1 | 3.3 | 17.8 |

It can be seen that, when the maximum width W=0.3L, the coupled-out efficiency EFF decreases significantly, and the efficiency deteriorates seriously. When the maximum width W reaches W=0.8, the uniformity index UNI is up to 17.8, and the uniformity deteriorates seriously. Therefore, the length-width ratio W/L of the optical unit structure in the waveguide grating according to the embodiment of the disclosure has a significant impact on performance of the grating structure, and its range should be limited.

(Data Example 3)

In data example 3, the coupled-out efficiencies and uniformity indices of grating structures formed by optical unit structures with different distances d between the predetermined sections and the first ends are simulated and compared.

Figure 10:
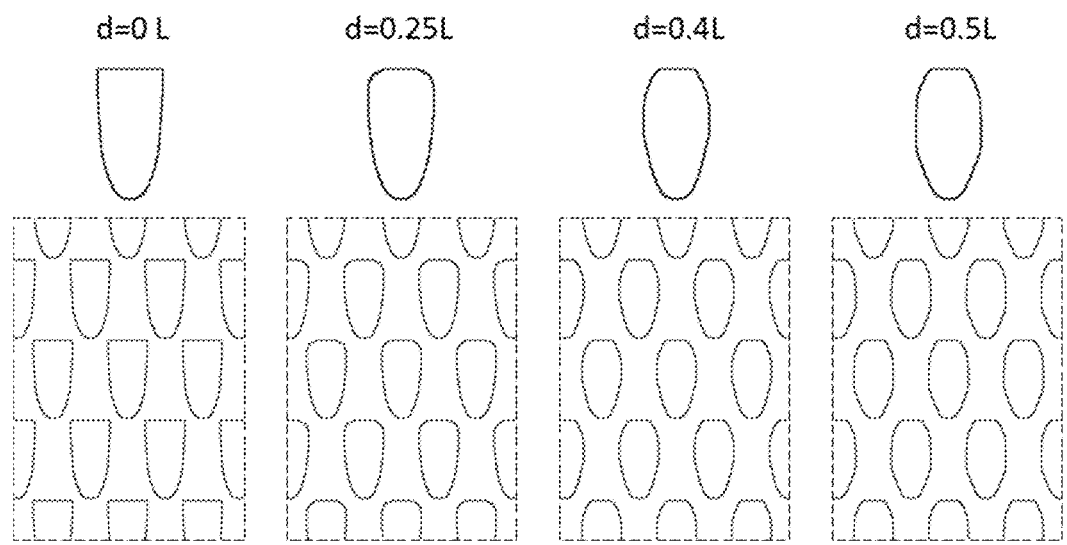
FIG. 10 shows optical unit structures with different distances between a predetermined section and a first end and grating structures formed therefrom.

FIG. 10 shows the optical unit structures with different distances d between the predetermined sections and the first ends, and four grating structures formed therefrom. As shown in FIG. 10, the distances d(s) of these four grating structures are 0L, 0.25L, 0.4L, and 0.5L respectively, and other structure parameters are shown in Table 5 (unit: nm):

TABLE 5

|  | L | W | w1 | w2 | d | l | P | D | n |
|---|---|---|---|---|---|---|---|---|---|
| 1A、1B、1C | 434 | 220 | 100 | 31 | variabl | 100 | 420 | 450 | 2 |

Based on the structures shown in FIG. 10 and the same conditions of light coupling into the grating structures, the coupling-out efficiencies EFF(s) and uniformity indices UNI(s) of the grating structures at the centers of their eye boxes obtained by simulation are shown in Table 6:

TABLE 6

|  | d = 0 L | d = 0.25 L | d = 0.4 L | d = 0.5 L |
|---|---|---|---|---|
| EFF | 2.5e−4 | 2.5e−4 | 2.6e−4 | 2.6e−4 |
| UNI | 3.3 | 3.3 | 3.5 | 4.1 |

It can be seen that, when the distance d is in a range of 0-0.4L, the coupled-out efficiency EFF and uniformity index UNI of the grating structure reach a better level; and when d=0.5L, the coupled-out efficiency EFF remains at a better level, while the uniformity is significantly reduced.

(Data Example 4)

In Data Example 4, the coupled-out efficiencies and uniformity indices of grating structures formed by optical unit structures with predetermined sections having different lengths are simulated and compared.

Figure 11:
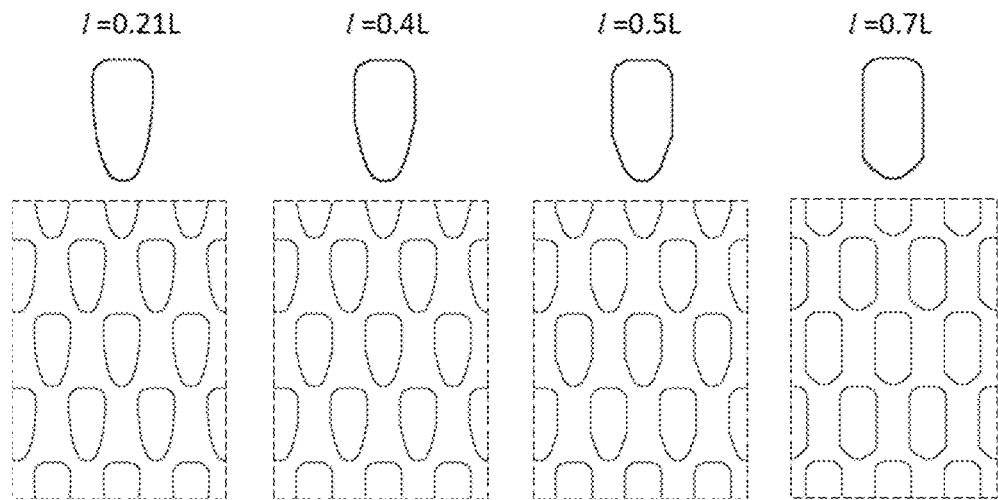
FIG. 11 shows optical unit structures with different lengths in a predetermined section and grating structures formed therefrom.

FIG. 11 shows the optical unit structures with the predetermined sections having different lengths, and four grating structures formed therefrom. As shown in FIG. 11, for the four grating structures, lengths l(s) of the predetermined sections of the optical unit structures are 0.21L, 0.4L, 0.5L, and 0.7L respectively, and other structure parameters are shown in Table 7 (unit: nm):

TABLE 7

|  | L | W | w1 | w2 | d | l | P | D | n |
|---|---|---|---|---|---|---|---|---|---|
| 1A、1B、1C | 434 | 220 | 100 | 31 | 109 | variabl | 420 | 450 | 2 |

Based on the structures shown in FIG. 11 and the same conditions of light coupled into the grating structures, the coupled-out efficiencies EFF(s) and uniformity index UNI(s) of the grating structures at the centers of their eye boxes obtained by simulation are shown in Table 8:

TABLE 8

|  | l = 0.21 L | l = 0.4 L | l = 0.5 L | l = 0.7 L |
|---|---|---|---|---|
| EFF | 2.5e−4 | 2.6e−4 | 2.6e−4 | 2.4e−4 |
| UNI | 3.3 | 3.3 | 3.3 | 3.9 |

It can be seen that, when the length l of the predetermined section is less than 0.7L, the coupled-out efficiency EFF and uniformity index UNI of the grating structure reach a better level; and when l=0.7L, the uniformity decreases slightly, and the index UNI rises to 3.9.

(Data Example 5)

In Data Example 5, the coupled-out efficiencies and uniformity indices of grating structures formed by optical unit structures with different widths at the second ends are simulated and compared.

Figure 12:
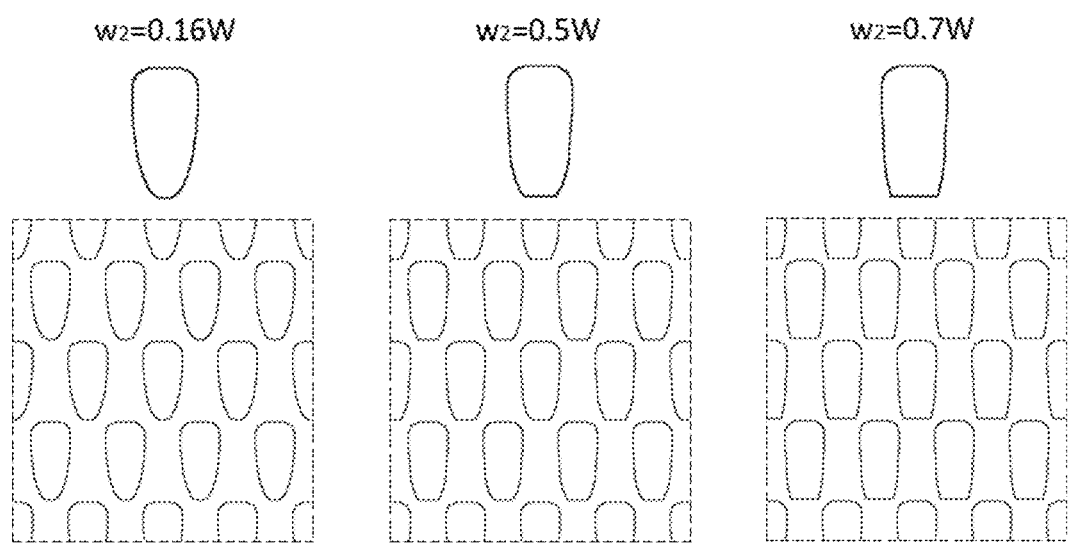
FIG. 12 shows optical unit structures with different widths at a second end and grating structures formed therefrom.

FIG. 12 shows optical unit structures with different widths at the second ends, and three grating structures formed therefrom. As shown in FIG. 12, for the three grating structures, the widths w2(s) of the second ends of the optical unit structures are 0.16W, 0.5W, and 0.7W respectively, and other structure parameters are shown in Table 9 (unit: nm):

TABLE 9

|  | L | W | w1 | w2 | d | l | P | D | n |
|---|---|---|---|---|---|---|---|---|---|
| 1A、1B、1C | 434 | 220 | 100 | variab | 109 | 100 | 420 | 450 | 2 |

Based on the structures shown in FIG. 12 and the same conditions of light coupled into the grating structures, the coupled-out efficiencies EFF(s) and uniformity indices UNI(s) of the grating structures at the centers of their eye boxes obtained by simulation are shown in Table 10:

TABLE 10

|  | w2 = 0.21 W | w2 = 0.5 W | w2 = 0.7 W |
|---|---|---|---|
| EFF | 2.5e−4 | 2.4e−4 | 2.4e−4 |
| UNI | 3.3 | 3.4 | 4.1 |

It can be seen that, when the width w2 of the second end is less than 0.7W, the coupled-out efficiency EFF and uniformity index UNI of the grating structure is at a better level; and when w2 reaches 0.7L, the uniformity decreases, and its index UNI rises to 4.1.

As discussed above with reference to the illustration of the figures, the followings are provided in this application:

(1) A diffraction optical waveguide, comprising a waveguide substrate and a grating structure formed on the waveguide substrate, wherein,
the grating structure comprises a plurality of optical unit structures arranged in an array along a plane, the optical unit structure is a concave hole structure or a convex structure formed on the waveguide substrate and has a first end and a second end in a first direction parallel to the plane, and a distance between the first end and the second end along the first direction is a length L of the optical unit structure;
the optical unit structure has a maximum width W perpendicular to the first direction in a predetermined section along the first direction, where $0.3L \leq W \leq 0.7L$; and
in the first direction, a central position of the predetermined section is at a predetermined distance d from the first end, where $d < 0.5L$, and a width of the optical unit structure in a direction perpendicular to the first direction gradually decreases from the predetermined section to the first end as well as from the predetermined section to the second end, so that a centroid of a cross-section of the optical unit structure parallel to the plane is closer to the first end relative to the second end.

(2) The diffractive optical waveguide of item (1), wherein the grating structure is configured as a coupling-out grating, the coupling-out grating couples at least a part of the light propagating thereinto along a coupling-in direction within the waveguide substrate, out of the waveguide substrate by diffraction, and the coupling-in direction is substantially parallel to the first direction.

(3) The diffractive optical waveguide of item (2), wherein the first end of the optical unit structure is located upstream along the coupling-in direction, and the second end is located downstream along the coupling-in direction.

(4) The diffractive optical waveguide of item (1), wherein the predetermined distance d satisfies $d \leq 0.4L$.

(5) The diffractive optical waveguide of item (1), wherein a length l of the predetermined section in the first direction satisfies $0 \leq l \leq 0.7L$.

(6) The diffractive optical waveguide of item (1), wherein the optical unit structure is the concave hole structure formed on the waveguide substrate.

(7) The diffractive optical waveguide of item (1), wherein the first end has a first width w1 perpendicular to the first direction, where $0 \leq w1 \leq W$; and the second end has a second width w2 perpendicular to the first direction, where $0 \leq w2 \leq 0.7W$.

(8) The diffractive optical waveguide of any one of items (1)-(5), wherein the optical unit structure has a first arc-shaped profile between the predetermined section and the first end, and the first arc-shaped profile is in the shape of an outwardly raised arc.

(9) The diffractive optical waveguide of any one of items (1)-(6), wherein the optical unit structure has a second arc-shaped profile between the predetermined section and the second end, and the second arc-shaped profile is in the shape of an outwardly raised arc.

(10) The diffractive optical waveguide of any one of items (1)-(7), wherein the optical unit structure has a symmetry axis substantially parallel to the first direction.

(11) The diffractive optical waveguide of item (1), wherein the first end has a form of a vertex, a straight side, or a concave side; and/or the second end has a form of a vertex, a straight side, or a concave side.

(12) The diffractive optical waveguide of item (1), wherein the optical unit structure has a side wall connected between the first end and the second end, and a local depression or protrusion is formed on the side wall.

(13) The diffractive optical waveguide of any one of items (1)-(12), wherein the array comprises a plurality of rows perpendicular to the first direction formed by the arrangement of the plurality of optical unit structures; the plurality of rows are arranged at a predetermined interval in the first direction; the optical unit structures are arranged at a period P in the rows; and the optical unit structures in two adjacent rows of the plurality of rows are staggered by a predetermined distance s in a direction perpendicular to the first direction, where $s = P/n$ and $1 < n \leq 5$, preferably $n = 2$.

(14) A display device, comprising the diffractive optical waveguide of any one of items (1)-(13).

The display device of item (14), wherein the display device is a near-eye display device, which comprises a lens and a frame for holding the lens close to the eye, the lens comprising the diffraction optical waveguide.

(16) The display device of item (14) or (15), wherein the display device is an augmented reality display device or a virtual reality display device.

The above description is merely an illustration of the preferred embodiments of the present application and the applied technical principles. Those skilled in the art should understand that the scope of the disclosure involved in the present application is not limited to the technical solution formed by the specific combination of the above technical features, but also covers other technical solutions formed by any combination of the above technical features or their equivalent features without departing from the inventive concept. For example, the technical solution is formed by replacing the above features with (but not limited to) the technical features with similar functions disclosed in the present application.

What is claimed is:

1. A diffraction optical waveguide, comprising a waveguide substrate and a grating structure formed on the waveguide substrate, wherein,
the grating structure comprises a plurality of optical unit structures arranged in an array along a plane, wherein each optical unit structure is a concave hole structure or a convex structure formed on the waveguide substrate and has a first end and a second end in a first direction parallel to the plane, and a distance between the first end and the second end along the first direction is a length L of each optical unit structure;
each optical unit structure has a maximum width W perpendicular to the first direction in a predetermined section along the first direction, where $0.3L \leq W \leq 0.7L$;
in the first direction, a central position of the predetermined section is at a predetermined distance d from the first end, where $d<0.5L$, and a width of each optical unit structure in a direction perpendicular to the first direction gradually decreases from the predetermined section to the first end as well as from the predetermined section to the second end, so that a centroid of a cross-section of each optical unit structure parallel to the plane is closer to the first end relative to the second end;
the grating structure is configured as a coupling-out grating, the coupling-out grating couples at least a part of the light propagating thereinto along a coupling-in direction within the waveguide substrate, out of the waveguide substrate by diffraction, and the coupling-in direction is substantially parallel to the first direction; and
the first end of each optical unit structure is located upstream along the coupling-in direction, and the second end is located downstream along the coupling-in direction.

2. The diffraction optical waveguide of claim 1, wherein the predetermined distance d satisfies $d \leq 0.4L$.

3. The diffraction optical waveguide of claim 1, wherein a length l of the predetermined section in the first direction satisfies $0L \leq l \leq 0.7L$.

4. The diffraction optical waveguide of claim 1, wherein each optical unit structure is the concave hole structure formed on the waveguide substrate.

5. The diffraction optical waveguide of claim 1, wherein the first end has a first width w1 perpendicular to the first direction, where $0 \leq w1 \leq W$; and the second end has a second width w2 perpendicular to the first direction, where $0 \leq w2 \leq 0.7W$.

6. The diffraction optical waveguide of claim 1, wherein each optical unit structure has a first arc-shaped profile between the predetermined section and the first end, and the first arc-shaped profile is in shape of an outwardly raised arc.

7. The diffraction optical waveguide of any one of claim 5, wherein each optical unit structure has a first arc-shaped profile between the predetermined section and the first end, and the first arc-shaped profile is in shape of an outwardly raised arc.

8. The diffraction optical waveguide of claim 1, wherein each optical unit structure has a second arc-shaped profile between the predetermined section and the second end, and the second arc-shaped profile is in shape of an outwardly raised arc.

9. The diffraction optical waveguide of claim 5, wherein each optical unit structure has a second arc-shaped profile between the predetermined section and the second end, and the second arc-shaped profile is in shape of an outwardly raised arc.

10. The diffraction optical waveguide of claim 6, wherein each optical unit structure has a second arc-shaped profile between the predetermined section and the second end, and the second arc-shaped profile is in shape of an outwardly raised arc.

11. The diffraction optical waveguide of claim 1, wherein each optical unit structure has a symmetry axis substantially parallel to the first direction.

12. The diffraction optical waveguide of claim 6, wherein each optical unit structure has a symmetry axis substantially parallel to the first direction.

13. The diffraction optical waveguide of claim 8, wherein each optical unit structure has a symmetry axis substantially parallel to the first direction.

14. The diffraction optical waveguide of claim 1, wherein the first end has a form of a vertex, a straight side, or a concave side; and/or the second end has a form of a vertex, a straight side, or a concave side.

15. The diffraction optical waveguide of claim 1, wherein each optical unit structure has a side wall connected between the first end and the second end, and a local depression or protrusion is formed on the side wall.

16. The diffraction optical waveguide of claim 1, wherein the array comprises a plurality of rows perpendicular to the first direction formed by the arrangement of the plurality of optical unit structures; the plurality of rows are arranged at a predetermined interval in the first direction; the optical unit structures are arranged at a period P in the rows; and the optical unit structures in two adjacent rows of the plurality of rows are staggered by a predetermined distance s in a direction perpendicular to the first direction, where $s=P/n$ and $1<n \leq 5$.

17. The diffraction optical waveguide of claim 14, wherein $n=2$.

18. A display device comprising the diffraction optical waveguide of claim 1.

19. The display device of claim 18, wherein the display device is a near-eye display device, which comprises a lens and a frame for holding the lens close to the eye, the lens comprising the diffraction optical waveguide.

20. The display device of claim 18 wherein the display device is an augmented reality display device or a virtual reality display device.

* * * * *